United States Patent [19]
Tsuda

[11] Patent Number: 4,942,406
[45] Date of Patent: Jul. 17, 1990

[54] LASER PRINTER WITH CLOCK POLYGON CONTROL FOR INCHES AND MILLIMETERS

[75] Inventor: Yukio Tsuda, Musashino, Japan

[73] Assignee: Kabushiki Kaisha Toshiba, Kawasaki, Japan

[21] Appl. No.: 248,844

[22] Filed: Sep. 26, 1988

[30] Foreign Application Priority Data

Sep. 29, 1987 [JP] Japan ................................ 62-242644

[51] Int. Cl.$^5$ ........................ B41J 2/44; G01D 15/14; G02B 26/08
[52] U.S. Cl. .................................. 346/108; 358/296; 350/6.6
[58] Field of Search .................. 346/108, 107 R, 160, 346/76 C; 358/296, 300, 302; 350/6.6, 6.8

[56] References Cited
U.S. PATENT DOCUMENTS 4,178,064 12/1979 Mrdjen ................... 350/6.6

Primary Examiner—Mark J. Reinhart
Attorney, Agent, or Firm—Finnegan, Henderson, Farabow, Garrett, and Dunner

[57] ABSTRACT

A laser printer comprises two reference clock generators to define the rotational speed of a polygon mirror (main scanning rotational mirror); namely, a first reference clock generator which generates a clock signal whose frequency is set so as to correspond to a scanning line density for a millimeter system, and a second reference clock generator for generating a clock signal whose frequency is set so as to correspond to a scanning line density for an inch system. One of these clock generators is selected in accordance with the scanning line density of received image data. As the rotational speed of the polygon mirror decreases, a decrease and an increase in the image data density occur in the directions of main- and sub-scan, respectively, whereas as the rotational speed of the polygon mirror increases, an increase and a decrease in the image data density occur in the directions of main- and sub-scan, respectively.

4 Claims, 3 Drawing Sheets

LASER PRINTER WITH CLOCK POLYGON CONTROL FOR INCHES AND MILLIMETERS

BACKGROUND OF THE INVENTION

1. Field of the Invention

The present invention relates to laser printers and, more particularly, to a system for conversion of a line density in a laser printer used for a recording section of a facsimile device.

2. Description of the Prior Art

Facsimile terminals using a telephone network are classified into four groups 1–4 according to the Recommendation T.O of CCITT (Consultive Committee in International Telegraphy and Telephony).

The groups 1–3 are purely for using a telephone network while the group 4 is defined for data exchanging purposes and may also be used in a telephone network by using modulation means.

Recently, the group 1 (hereinafter referred to as "G1") terminals tend to decrease in number due to communication expenditure while the terminals belonging to the groups 2, 3 and 4 (hereinafter referred to as "G2", "G3" and "G4", respectively) tend to be predominant.

In recording units used in the recording sections of such facsimile devices, the scanning line density is prescribed in a millimeter system at the G2 and G3 terminals while it is prescribed in an inch system at the G4 terminals, so that conversion between their scanning line densities is required in order to achieve compatibility.

For example, as shown in FIG. 1, conventional conversion of such scanning line density is performed by appropriately demodulating an incoming image signal fed through a telephone network or a data exchange network at a transmission control unit 1, and then converting the scanning line density of the demodulated image signal using a main-scan line density conversion unit 2, a sub-scan line density conversion unit 3 and a memory 4 such that the scanning line density of the demodulated signal meets the standard of a printer 5.

If, for example, image data in a millimeter system (16 dots/mm × 15.4 lines/mm) is printed by a printer in an inch system (for example, of 400 ppi (pulses per inch) type), the following main-and sub-scanning direction conversions are required:

The main-scanning direction conversion:

16 dots/mm=0.0625 mm/dot
→400 ppi=0.0635 mm/dot

Thus the conversion coefficient is given by
$K_M = 0.0635/0.0625 = 1.0157$

The sub-scanning direction conversion:

15.4 lines/mm=0.0649 mm/line
→400 ppi=0.0635 mm/line

Thus the conversion coefficient is given by
$K_S = 0.0635/0.0649 = 0.9784$

Namely, a decrease of 1.57% and an increase of 2.20% are required in line density conversion in the main and sub-scanning directions, respectively.

Thus, one pixel per $1/1.57\% \approx 64$ pixels is thinned out at the main scanning line density conversion circuit 2 while one line per $1/22\% \approx 45$ lines is added at the sub-scanning line density conversion circuit 3, such that the inch-system printer can record an transmitted millimeter-system image. Namely, electrical addition and thinning out of pixels results in conversion of the line density. However, such method of line density conversion has the problem that it will produce periodical vertical and horizontal streaks to thereby deteriorate the image quality. This problem is salient when halftone recording is performed especially using a dither process.

On the other hand, a so-called laser printer has recently been used as the recording section of a facsimile device, the laser printer employing an electrophotographic recording system in which the exposure unit is selectively irradiated with a laser beam according to image data.

As shown in FIG. 2, the laser printer mainly includes a laser output control unit 14 which receives image data which is demodulated and binarized by transmission control unit 1, generates a laser beam (an on-off optical signal) corresponding to the image data and controls the generation of the laser beam, a photosensitive drum 20 rotated in the direction of the shown arrow by a carrier motor 23 the rotation of which is controlled by a sub-scan carrier motor control unit 22, and a polygon mirror (main scanning rotating mirror) 15 rotated by a polygon motor 16 the rotation of which is controlled by a polygon motor control unit 19, and reflecting a laser beam output from the laser output control unit 14 such that the reflected laser beam is irradiated onto the photosensitive drum 20.

In the laser output control unit 14, an optical modulator modulates the laser beam, generated by a laser oscillator 11, on the basis of the binarized image data and a clock signal (image signal clock) having a predetermined period corresponding to the main-scanning line density to provide an on-off optical signal corresponding to the image data, as mentioned above. The on-off optical signal is irradiated continuously onto the rotating photosensitive drum 20 in accordance with the rotation of the polygon mirror 15 so that a latent image corresponding to the image data is formed on the drum 20 in the direction of main scan.

The photosensitive drum 20 is rotated in accordance with a clock signal having a predetermined period corresponding to the sub-scanning line density through the carrier motor 23 and sub-scanning line carrier motor control unit 20, as mentioned above, such that a latent image is continuously formed on the drum in the direction of sub-scan.

In such laser printer, image recording is realized at the predetermined scanning line density by an appropriate mutual adjustment in timing between the main- and sub-scanning operations for the formation of the latent image.

In FIG. 2, reference character K denotes a developing unit which develops the latent image; W, recording paper to which the developed image is transferred; R, an exposure system of the laser printer; and P, the recording section of the printer.

In the laser printer, scanning line density conversion between the millimeter and inch systems, is generally performed as follows:

As mentioned above, the laser beam irradiated onto the drum 20 through the polygon mirror 15 is optically modulated in accordance with the clock signal having the predetermined period corresponding to the main scanning line density. Furthermore, the drum is rotated in accordance with the clock signal having the predetermined period corresponding to the sub-scan line density. As shown in FIG. 2, the conventional clock signal oscillator system includes a first millimeter-system clock signal oscillator 13a and a second inch-system signal oscillator 13b in correspondence to the main-scan line density, and a first millimeter-system clock signal generator 21a and a second inch-system clock signal generator 21b in correspondence to the sub-scanning line density. These two kinds of oscillators are used selectively each time the aforementioned conversion of the scanning line density is required. Namely, in a facsimile transmission, the two kinds of clock signal oscillators are selectively used to perform the conversion of the line density depending on whether the transmission facsimile is of a millimeter system (G2, G3) or of an inch system (G4).

According to this system, the conversion of a line density is performed by the conversion of the image signal clock in the main scan and the conversion of the conveyance speed in the sub-scan, so that a deterioration in the image quality such as that in the aforementioned printer is not caused. With a laser printer employing such line density conversion system, the provision of the two kinds of (main- and sub-scan) oscillators as mentioned above is indispensable, so that the circuit is complicated and expensive.

SUMMARY OF THE INVENTION

It is therefore an object of the present invention to provide a laser printer which has an inexpensive simplified structure to provide an excellent image quality, and may be applicable to any one of millimeter- and inch-system printers.

It is to be noted that even if the clock signal for defining the main scanning line density and the clock signal for defining the sub-scan line density may be fixed, conversion to a desired scanning line density is achieved between at least the millimeter- and inch-systems if the rotational speed of the polygon mirror changes. In view of this, according to the present invention, rotational speed changing means is disposed such that the rotational speed of the laser printer polygon mirror is changed in accordance with the scanning line density of image data. For example, a reference clock system for rotating the polygon motor may include a first millimeter-system clock and a second inch-system clock which are switchable therebetween in use.

Thus when the rotational speed of the laser printer polygon mirror is switched between a millimeter-system one and an inch-system one, the rotational speed of the polygon mirror which scans the laser beam over the photosensitive drum is also changed and hence the scanning speed, over the photosensitive drum, of the laser beam which is optically modulated in accordance with image data is changed accordingly.

For example, when transmitted millimeter-system image data is recorded by an inch-system printer, a decrease and an increase in the image density in the directions of main-scan and sub-scan, respectively, are achieved by increasing the rotational speed of the polygon motor by 1-3% compared to the rated rotational speed.

When transmitted inch-system image data is printed by a millimeter-system printer, an increase and a decrease in the image density in the directions of main-scan and sub-scan, respectively, are realized by decreasing the rotational speed of the polygon motor by 1-3% compared to the rated rotational speed.

As just mentioned above, continuous conversion is performed without adding and thinning out pixels, so that periodic generation of streaks and hence deterioration of the image quality which would occur in the conventional system will not occur in the inventive printer. Therefore, a good image quality is obtained. The clocks one of which is to be selected are for only one element, so that the whole structure of the printer is simple and the conversion of the scanning line density is achieved at reduced cost.

DESCRIPTION OF THE PREFERRED EMBODIMENT

Figure 3:
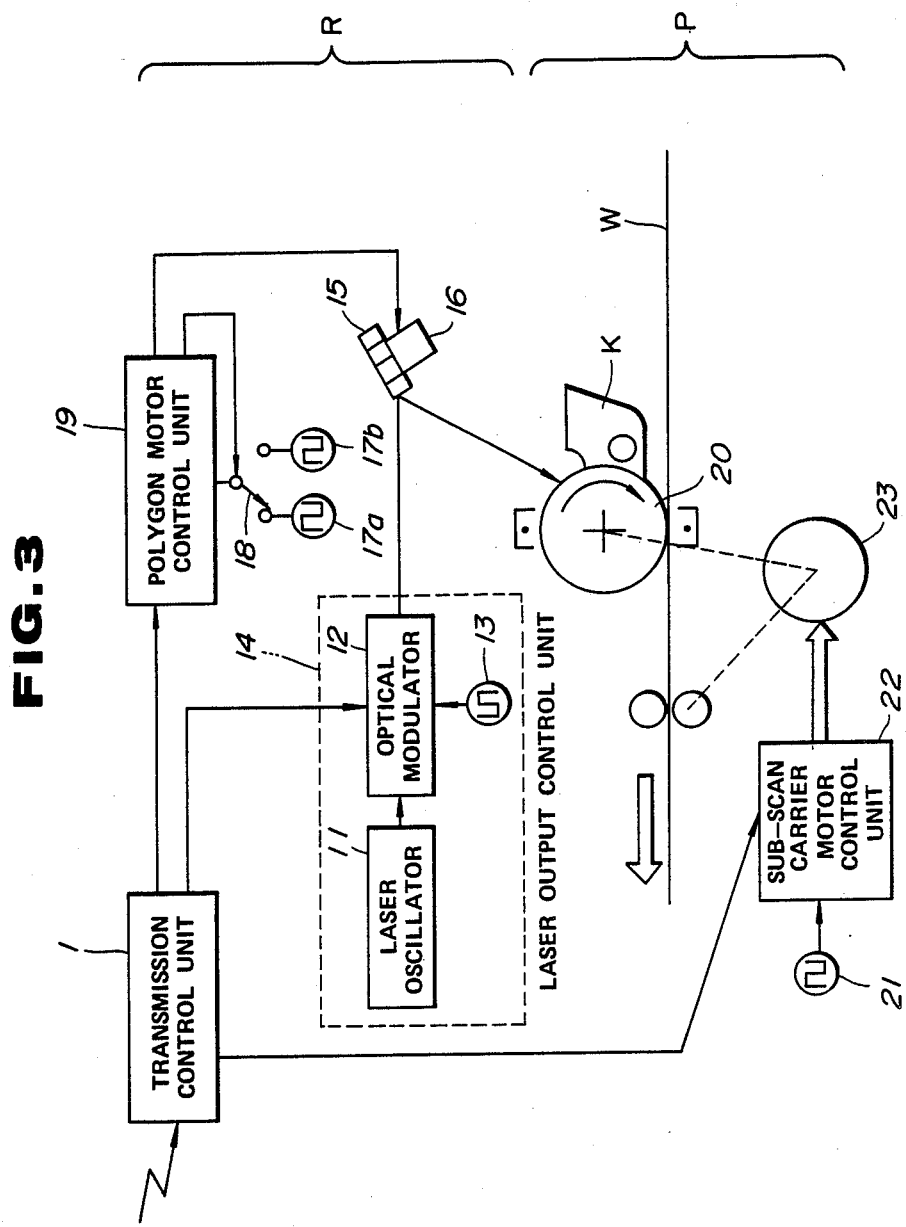
FIG. 3 is a block diagram schematically illustrating one embodiment of a laser printer according to the present invention.

An embodiment of a laser printer according the present invention will now be described in detail with reference to FIG. 3. The feature of the laser beam printer lies in an exposure system R which outputs received image data as a laser beam signal which is then written onto the photosensitive drum to thereby form a latent image. While the printer is naturally a G4 inch-system printer, it is also capable of recording millimeter-system image data in addition to inch-system image data.

The exposure system R includes a transmission control unit 1 which demodulates received image data and converts it to a binary signal as data to be recorded, a laser output control unit 14 which optically modulates the output from the laser oscillator 11 at the optical modulator 12 in accordance with a clock signal from the image signal clock generator 13 and outputs the oscillated laser beam as an on-off optical signal in accordance with the binary image data signal, a polygon mirror 15 which operates to reflect the laser beam from the control unit 14 onto a photosensitive drum 20 of the recording section P and to scan same, a polygon motor 16 which rotates the polygon mirror, a first polygon motor millimeter-system reference clock generator 17a, a second polygon motor inch-system reference clock generator 17b, switching means 18 which switches between the first and second reference clock generators 17a and 17b in accordance with a signal from the transmission control unit 1 designating one of the millimeter and inch systems, and a polygon motor control unit 19 which is driven in accordance with a polygon motor reference clock from the selected one of the reference clock generators to drive the polygon motor 16. The polygon motor reference clock which determines the rotational speed of the polygon motor is selected by the switching means 18 depending on whether the transmitted image data is of a millimeter system or of an inch system and hence the scanning speed of the laser beam over the photosensitive drum 20 is changed.

Figure 1:
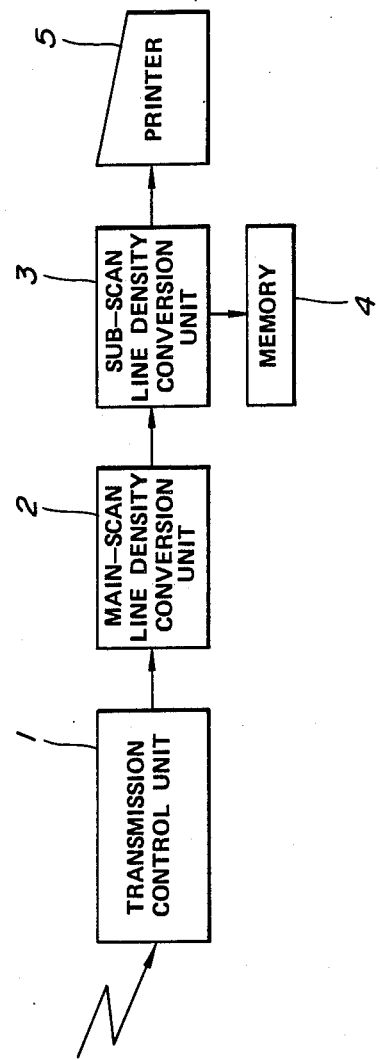
FIG. 1 is a block diagram schematically illustrating the structure of a conventional recording device used generally as a facsimile recording section which converts the scanning line density.
Figure 2:
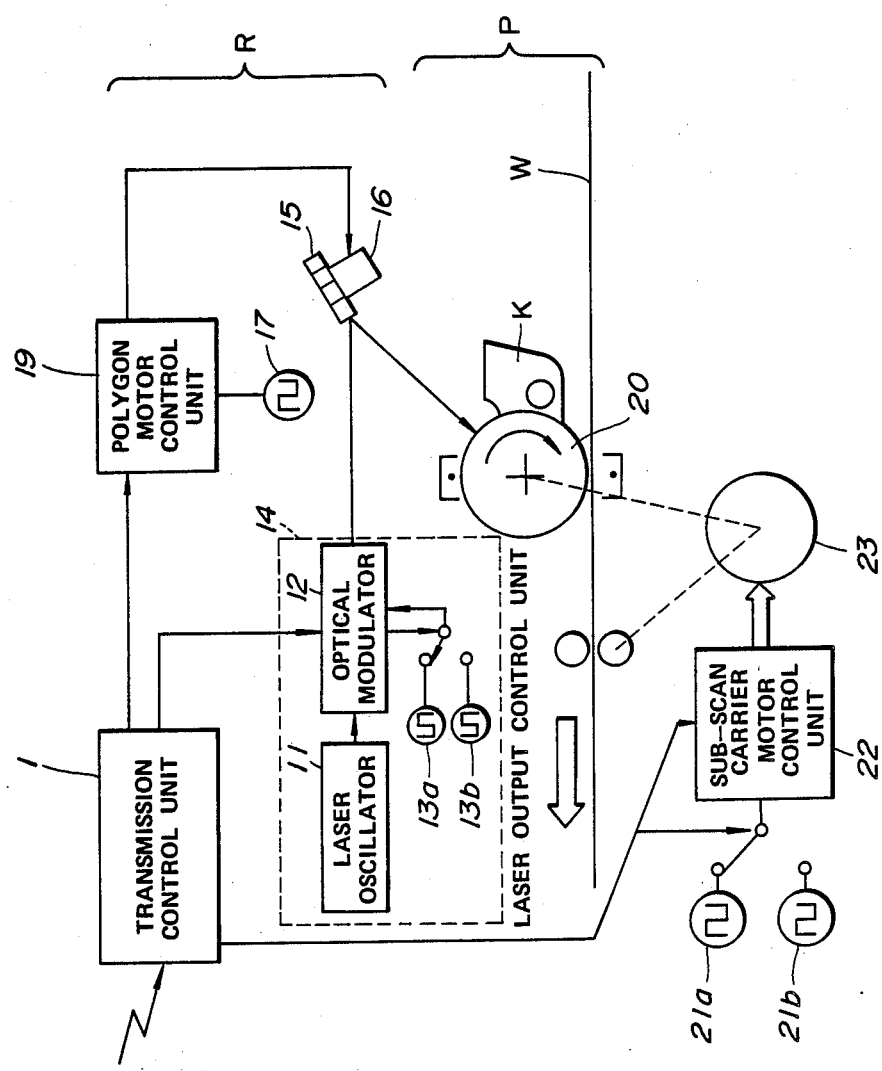
FIG. 2 is a block diagram schematically illustrating the structure of a conventional laser printer used as a facsimile recording section which converts the scanning line density.

The remaining structural portions of the printer are similar to corresponding ones of the conventional laser printer of FIG. 2. Therefore, the optical on-off signal output from the laser control unit 14 is irradiated onto the photosensitive drum 20 in accordance with the rotation of the polygon mirror to thereby form a latent image onto the drum. The latent image is developed by the developing unit K and transferred as a toner image onto recording paper W. The photosensitive drum 20 rotates following the sub-scan carrier motor 23, the rotational speed of which is controlled by the sub-scan carrier motor control circuit 22 which in turn receives a reference clock from the sub-scan motor reference clock generator 21.

The respective oscillating frequencies of the first and second polygon motor reference clock generators 17a and 17b are set so as to maintain at a ratio of 0.98:1 the rotational speeds of the polygon motor 16 which is rotated in accordance with clock signals generated from the clock generators 17a and 17b. Assume herein that the number of faces of the polygon mirror 15 is 6, and that the polygon motor 16 is driven, for example, at 10,000 rpm by the second polygon motor reference clock 17b, and driven at 9,800 rpm which is 2% less than the former rotational speed by the first polygon motor reference clock 17a.

In operation, assume that transmitted image data is for a millimeter system for G2 or G3. Further, assume that the size of a sheet of recording paper used is A4, that the printer is at 400 ppi for an inch system, that the number of pixels per line is 3,456, and that the effective angle rate, namely, the effective recording width to the overall scanning width obtained when one face of the polygon mirror scans the laser beam, is 69.12%.

In this case, the polygon motor control circuit 19 selects the first polygon motor reference clock generator 17a by the switching means 18 in accordance with the signal from the transmission control unit 1. Thus, the rotational speed of the polygon motor 16 is determined by a clock signal generated by the clock generator 17a. Thus, the rotational speed of the polygon mirror 15 is from 10,000 (for the inch system) to 9,800 rpm.

Each time the laser output control unit 14 receives a clock signal from the reference clock generator 13, it modulates the output from the laser oscillator 11 at the optical modulator 12 in accordance with a binary image signal from the transmission control unit 1 and outputs the laser beam as the on-off optical signal. The optical on-off signal is irradiated onto and scanned over the photosensitive drum 20 by the rotational polygon mirror 15 for exposing purposes. As the drum 20 rotates, development is performed in a regular manner and transfer is performed onto recording paper W. In this case, the drum 20 is rotated at a constant speed in accordance with the reference clock from the sub-scan motor reference clock generator 21, as mentioned above. Thus, millimeter-system recording is performed by the inch-system printer.

The scanning line density will now be described. The rotational speed of the polygon mirror 15 on the main-scanning side is given by 9,800 rpm/60s = 163.3 rps Therefore, the time required for one rotation is 6.12245 ms. Since the polygon mirror has six faces, the time required for scanning one mirror is given by 6.12254 ms/6 faces = 1.020 ms/line The effective recording time is given by $$1.20 \ ms/line \times 69.12\% = 705.02 \ \mu s/line \quad (1)$$

In the inch system recording, the effective recording time is given by $$1 \ ms/line \times 69.12\% = 691.20 \ \mu s/line \quad (2)$$

Since 3,456 pixels are recorded in 691.20 μs, it will be understood that 691.20 μs/3,456 pixels = 200 ns/pixel and that the period of the clock signal from the image signal clock generator is 200 ns.

If the effective recording time for the system of millimeters is recorded in accordance with a clock signal generated at intervals of 200 ns, the number of effective recording pixels is obtained from the above value (1) as follows:

705.02 μs/line/200 ns/pixel = 3,525.1 pixels/line

Thus, 3,525.1 pixels/line are recorded.

3,456 inch-system pixels/line are changed to 3,525.1 pixels/line. Therefore, 3,525.1 pixels/line/3,456 pixels/line = 1.02

It will be understood that each pixel is reduced by 2%.

With 400 ppi and 1 ms/line on the sub-scan side, 400 ppi/25.4 mm/inch = 0.0635 mm/line 0.0635 mm/line/1 ms/line = 63.5 mm/s for an inch system, so that recording paper is conveyed at a speed of 63.5 mm/s.

If the millimeter system is selected and the time required for the polygon mirror 15 to scan one line is 1.02 ms/line, 1/1.02 ms/line = 980.39 lines/s Therefore, 980.39 lines are scanned during feed of a paper length of 63.5 mm, and therefore, the width of one line is given by 63.5 mm/980.39 lines = 0.06477 mm/line As just described above, 0.0635 mm/line for the inch system are changed to 0.06477 mm/line by selection of the second polygon motor reference clock for the millimeter system. Namely, 0.06477 mm/line,/0.0635 mm/line = 1.02

Thus an increase of 2% is performed in the direction of sub-scan.

As just described above, when millimeter-system image data is printed by an inch-system printer, a decrease in the rotational speed of the polygon mirror 15 by 2% leads to a decrease of 2% in the direction of main-scan and an increase of 2% in the direction of sub-scan so that distortion of an image is suppressed to 1% falling within an allowance according to Recommendation of CCITT although in the actual conversion from the inch system to the millimeter system, a decrease of 1.57% is performed in image density in the direction of main scan while an increase of 2.20% is performed in the direction of sub-scan. Therefore, solely by switching between the polygon mirror reference clocks, an input G2 or G3 signal is easily reproduced by a G4 printer. Since pixels are neither added nor thinned out, the image quality is not deteriorated to thereby maintain an excellent image quality.

When received image data is for an inch system, the polygon motor 15 is rotated at a rated speed, for example, of 10,000 rpm. In this case, a well-known regular recording operation is performed, of course.

While in the embodiment the rotational speed of the polygon mirror 15 is described as being changed by 2% in order to simplify calculations, it is required to be set practically to any desired value within 1-3% satisfying the Recommendation of CCITT.

While reproduction of millimeter-system image data by the inch-system printer has been shown and described, the present invention may be applicable to the reproduction of inch-system image data by a millimeter-system printer.

What is claimed is:

1. A laser printer with clock generator polygon control for inches and millimeters, comprising:
   a laser generator for generating laser light;
   a light modulator for modulating the laser light in response to input picture image information, the laser light being generated by the laser generator at a speed corresponding to a density of scanning lines in an inch system;
   a recording unit having a photosensitive drum rotating at a constant speed corresponding to the density of the scanning lines in the inch system for forming a latent picture image thereon in response to light from said light modulator incident thereon and for printing a developed latent picture image onto a printing paper;
   a polygon mirror for reflecting and scanning the laser light modulated by the light modulator onto the photosensitive drum so as to form a picture image corresponding to the latent picture image on the photosensitive drum;
   a first clock generator for setting a rotation speed of the polygon mirror to a first rotation speed corresponding to the density of the scanning lines in the inch system;
   a second clock generator for setting the rotation speed of the polygon mirror to a rotation speed which is reduced by a predetermined ratio from the first rotation speed; and
   switching means for selecting one of the first and the second clock generators in accordance with a density of the scanning lines of the picture image information, the switching means selecting the first clock generator when the picture image information has a density of scanning lines in the inch system and the second clock generator when the picture image information has a density of scanning lines in a millimeter system.

2. Laser printer with clock generator polygon control for inches and millimeters of claim 1, wherein the predetermined ratio is selected from 1% to 3%.

3. A laser printer with clock generator polygon control for inches and millimeters, comprising:
   a laser generator for generating laser light;
   a light modulator for modulating the laser light in response to input picture image information, the laser light being generated by the laser generator at a speed corresponding to a density of scanning lines in a millimeter system;
   a recording unit having a photosensitive drum rotating at a constant speed corresponding to the density of the scanning lines in the millimeter system for forming a latent picture image thereon in response to light from said light modulator incident thereon and for printing a developed latent picture image onto a printing paper;
   a polygon mirror for reflecting and scanning the laser light modulated by the light modulator onto the photosensitive drum so as to form a picture image corresponding to the latent picture image on the photosensitive drum;
   a first clock generator for setting a rotation speed of the polygon mirror to a first rotation speed corresponding to the density of the scanning lines in the millimeter system;
   a second clock generator for setting the rotating speed of the polygon mirror to a rotation speed which is increased by a redetermined ratio from the first rotation speed; and
   switching means for selecting one of the first and the second clock generators in accordance with a density of the scanning lines of the picture image information, the switching means selecting the first clock generator when the picture image information has a density of scanning lines in the millimeter system and the second clock generator when the picture image information has a density of scanning lines in an inch system.

4. A laser printer with clock generator polygon control for inches and millimeters of claim 3, wherein the predetermined ratio is selected from 1% to 3%.

* * * * *